United States Patent
Ryon

(10) Patent No.: US 6,718,954 B2
(45) Date of Patent: Apr. 13, 2004

(54) APPARATUS FOR COOLING FUEL AND FUEL DELIVERY COMPONENTS

(76) Inventor: Lee S. Ryon, 1414 Melanie La., Phenix City, AL (US) 36867

( * ) Notice: Subject to any disclaimer, the term of this patent is extended or adjusted under 35 U.S.C. 154(b) by 48 days.

(21) Appl. No.: 10/154,341

(22) Filed: May 23, 2002

(65) Prior Publication Data

US 2003/0217738 A1 Nov. 27, 2003

(51) Int. Cl.$^7$ .............................................. F02M 15/00
(52) U.S. Cl. ..................................................... 123/541
(58) Field of Search ................................. 123/541, 518

(56) References Cited

U.S. PATENT DOCUMENTS

| | | | |
|---|---|---|---|
| 4,453,503 A | 6/1984 | Freeburn | |
| 4,898,141 A | 2/1990 | Fiedler | |
| 5,558,069 A | 9/1996 | Stay | |
| 5,636,668 A | 6/1997 | Thompson | |
| 5,819,712 A | 10/1998 | Cox | |
| 5,887,555 A | 3/1999 | Schmitz | |
| 5,957,113 A | * 9/1999 | Masaki et al. | 123/518 |
| 5,988,265 A | 11/1999 | Marthaler | |
| 6,024,074 A | * 2/2000 | Koethe | 123/541 |

FOREIGN PATENT DOCUMENTS

DE       3411392       10/1985

OTHER PUBLICATIONS

Website at www.dangerden.com, for which excerpts are enclosed in hard copy.
Website at www.maxxxpert.com for which excerpts are enclosed in hard copy.
Website at www.cooltechnica.com for which excerpts are enclosed in hard copy

* cited by examiner

*Primary Examiner*—Marguerite Mcmahon
(74) *Attorney, Agent, or Firm*—Joseph S. Bird, III; Bradley, Arant, Rose & White LLP

(57) ABSTRACT

An apparatus is disclosed for cooling fuel by means of the cold side of a thermoelectric unit just prior to entry of the fuel into the fuel delivery components (injectors, carburetors and throttle bodies). An excess of cooling is supplied sufficient to cool the fuel delivery components so as to provide an additional buffer of cooling for the fuel and to prevent substantial re-absorption of heat after the fuel is cooled. The hot side of the thermoelectric unit is cooled by a secondary cooling fluid system separate and distinct from the principal cooling fluid system for the engine block. In one embodiment, excess fuel is shunted by a fuel bypass pressure regulator to a fuel bypass line, and the excess fuel is the cooling fluid which is returned to the fuel tank.

6 Claims, 7 Drawing Sheets

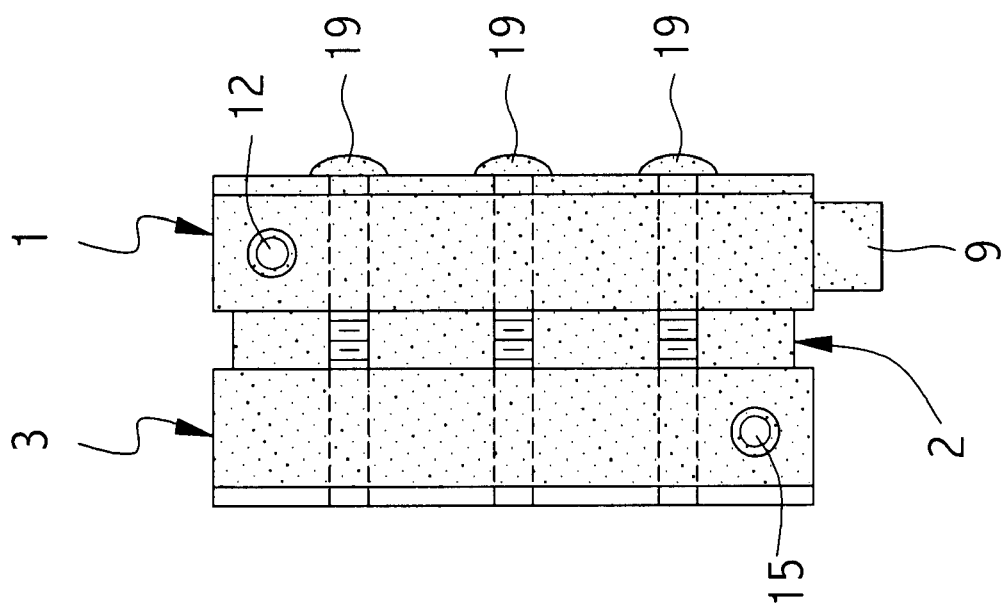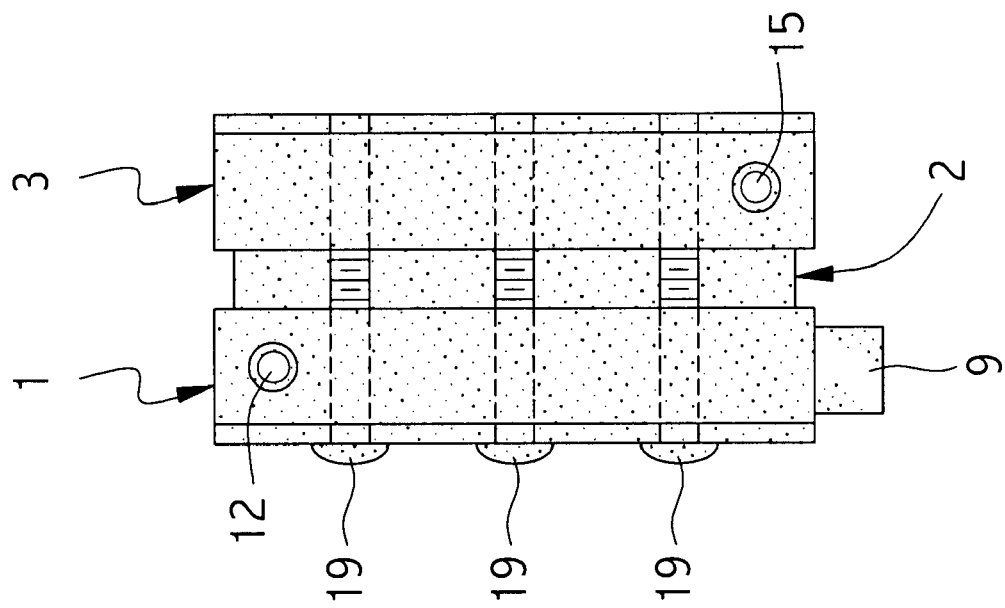
FIG. 5

APPARATUS FOR COOLING FUEL AND FUEL DELIVERY COMPONENTS

1. FIELD OF THE INVENTION

The present invention is a novel apparatus for cooling fuel for internal combustion engines, as well as cooling the fuel delivery components which are the fuel injectors, carburetors and throttle bodies.

2. BACKGROUND OF THE INVENTION

Auto-ignition or pre-ignition diminishes engine performance because excessive pressure or heat inside the cylinder causes the fuel/air mix to fire at inopportune times. See Taylor, Internal Combustion Engine in Theory and Practice, 40–41, 84 (MIT Press Rev. Ed. 1985). One effort to reduce cylinder temperature addressed the concern of auto-ignition by reversing the flow of fluid from the radiator so that the coolest fluid entered the hottest part of the engine block, so as to cool the cylinder walls. See Lumley, Engines: An Introduction, 95–96 (Cambridge Univ. Press: 1999). Cooler fuel/air mix inside the cylinders helps to insure ignition will occur when the spark is delivered by the timing mechanism, thus producing optimal performance within the compression ratio. Cooler fuel than currently available would allow engine timing to be moved closer to top dead center (TDC), thus increasing the power stroke of each piston. Cooler fuel inside the intake manifold also means more oxygen will be present in the fuel/air mix because a cooler gas will be denser, and more oxygen near the ignition spark insures more efficient and rapid oxidation of the fuel inside the cylinder.

The heat under the hood of a car is located (1) in the engine components as it is conducted from the cylinders through the intake manifold and other components in the area and (2) also in the ambient air as it is heated by the engine and environmental conditions. The temperature of the engine components under many environmental conditions can be in the range of 150–250 degrees Fahrenheit. The temperature of the fluid cooling system for the engine (hereinafter called the "principal cooling system") is at least 150 degrees Fahrenheit. Fuel moves slowly enough through the fuel line to allow heat exchange, so fuel will also absorb heat by means of the fuel line itself acting as a heat exchange. Failure to supply enough cooling for the fuel close to the intake manifold means that the injectors, carburetor(s) or throttle bodies which introduce fuel into the intake manifold (collectively referred to herein as "fuel delivery components") results in the fuel delivery components acting as a heat exchange for the fuel. Thus, hot fuel delivery components increase the fuel temperature and eliminate the advantage of any efforts to cool the fuel upstream in the fuel system. Providing an excess amount of cooling for the fuel, however, allows the cooled fuel itself to cool the fuel delivery components, thus providing a cooled buffer area for the fuel as it passes into the intake manifold.

Various attempts have been made to improve engine performance by lowering the temperature of fuel entering the cylinders for ignition. These efforts have largely been ineffective because the devices or practices have not delivered enough cooling at the right location, i.e., just prior to entry of the fuel into the fuel delivery components. Previous fuel cooling devices are exemplified in Stay, U.S. Pat. No. 5,558,069 (cooling through compressed gas in a vortex tube); Schmitz, U.S. Pat. No. 5,887,555 (cooling in marine fuel pump to reduce vapor lock); Freeburn, U.S. Pat. No. 4,453,503 (remote thermoelectric unit cooled by air heat sink, "ambient" fresh or brine water, cascading thermoelectric units, or mechanical refrigeration); Marthaler, U.S. Pat. No. 5,988,265 (fuel cooler core cooled only by principal coolant system for engine block); and others in the above-listed patents. The prior art, however, suffers the disadvantage of lacking several elements of the present invention including, without limitation, a second cooling fluid system comprised of a cooling fluid radiator and cooling fluid pump. Additionally, none of the prior art cools the fuel delivery components to provide an additional buffer of cooling so as to minimize heat re-absorption after initial cooling of the fuel.

The lack of an effective fuel cooling apparatus in the prior art is manifested in part by the existence of various stop-gap methods of fuel cooling among racing enthusiasts such as refrigerating fuel cans with ice. Another indication of the state of the prior art is a device which injects gaseous nitrous oxide into the intake manifold. Nitrous oxide, however, is a drastic form of cooling, and can only be used briefly and in high gears because it produces extreme cooling and a tremendous spike in engine performance. Thus, there is a need for an apparatus to provide a cooling of fuel that improves engine performance consistently in any gear ratio. It would also be advantageous to provide a device that cools the fuel delivery components so as to minimize heat re-absorption prior to fuel entry into the intake manifold.

3. SUMMARY OF THE INVENTION

The present invention satisfies these needs by cooling fuel in a fuel-cooling block of a highly heat-conductive material which allows for maximum heat exchange of fuel with the cold side of a thermoelectric unit using the Peltier effect. The Peltier effect is the separation of heat and cold when current flows through dissimilar conductors. A thermoelectric unit is a sandwich formed by two ceramic plates with an array of small Bismuth Telluride couples in between. After the fuel has been cooled, the fuel then cools the fuel delivery components.

The apparatus contains at least one fuel-cooling block which contains at least one fuel entry port for fuel which is received from the fuel tank and the fuel pump, and also at least one fuel exit port which is coupled to the fuel delivery components, in the case of fuel injectors, by means of at least one fuel injector receptor cup. The fuel-cooling block has an opening on the inside which maximizes the heat exchange with the thermoelectric unit. The apparatus also contains a system for circulating cooling fluid (which is separate and distinct from the principal cooling system for the engine block) containing at least one cooling fluid block with at least one cooling fluid entry port coupled to a cooling fluid pump and to a cooling fluid radiator. The cooling fluid block has an opening on the inside which maximizes the heat exchange with the thermoelectric unit. The cooling fluid block, cooling fluid radiator and cooling fluid pump allow cooling fluid to circulate through the enclosed system. The apparatus contains a thermoelectric unit which has electrical terminals for receiving power from a power supply, a cold side thermally coupled with the fuel-cooling block for heat exchange, and a hot side thermally coupled with the cooling fluid block for heat exchange.

The above apparatus can be embodied so that the system for circulating cooling fluid uses excess fuel as the cooling fluid. The excess fuel is received by the cooling fluid block from the fuel bypass pressure regulator, and returns to the fuel tank where heat is exchanged. A controlled flow of fuel is assured by the fuel pump which pumps fuel from the fuel tank. Also, an additional heat sink can be coupled to the cooling fluid block and to the fuel tank, so as to provide additional cooling for the fuel if necessary.

The apparatus also contains an optional controllable switch to interrupt the power supply to the thermoelectric unit in the event the fuel is cooled to a pre-determined temperature.

4. BRIEF DESCRIPTION OF THE DRAWINGS

These and other features, aspects, structures, advantages, and functions are shown or are inherent in, and will become better understood with regard to, the following description and accompanied drawings where:

FIG. 5 is a side view of combined fuel-cooling block, thermoelectric unit and cooling fluid block showing the position of the components in FIG. 4 relative to at least one fuel injector.

Figure 7:
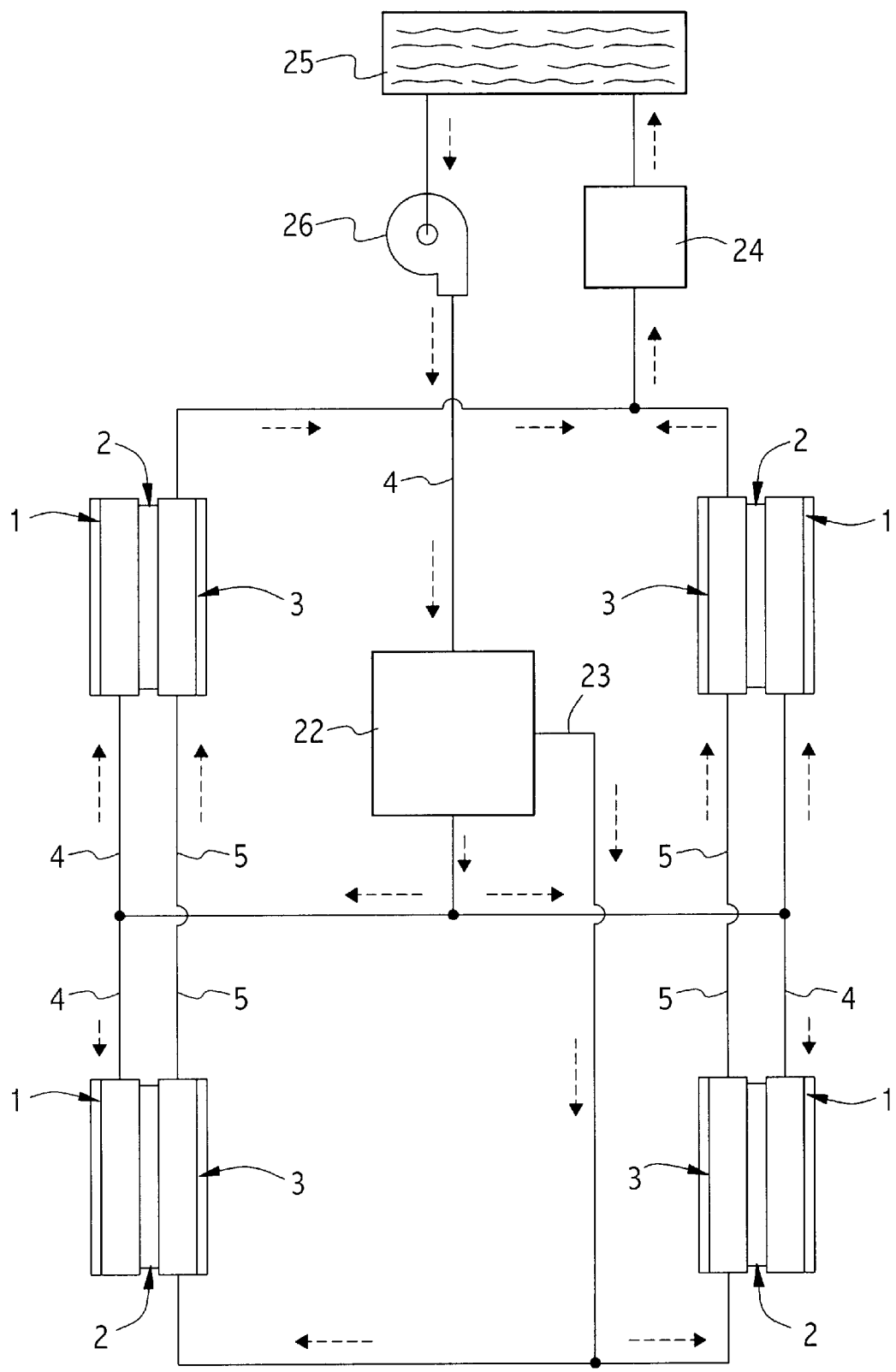

FIG. 7 is an overall schematic of the apparatus in the second embodiment in which the fuel delivery components are distributed in different locations on the perimeter of the intake manifold. FIG. 7 shows routing of fuel through the fuel-cooling blocks to the fuel delivery components as well as routing of excess fuel by the fuel pressure regulator to the fuel tank via the fuel bypass line through the cooling fluid blocks.

5. DETAILED DESCRIPTION OF THE PREFERRED EMBODIMENT

Figure 1:
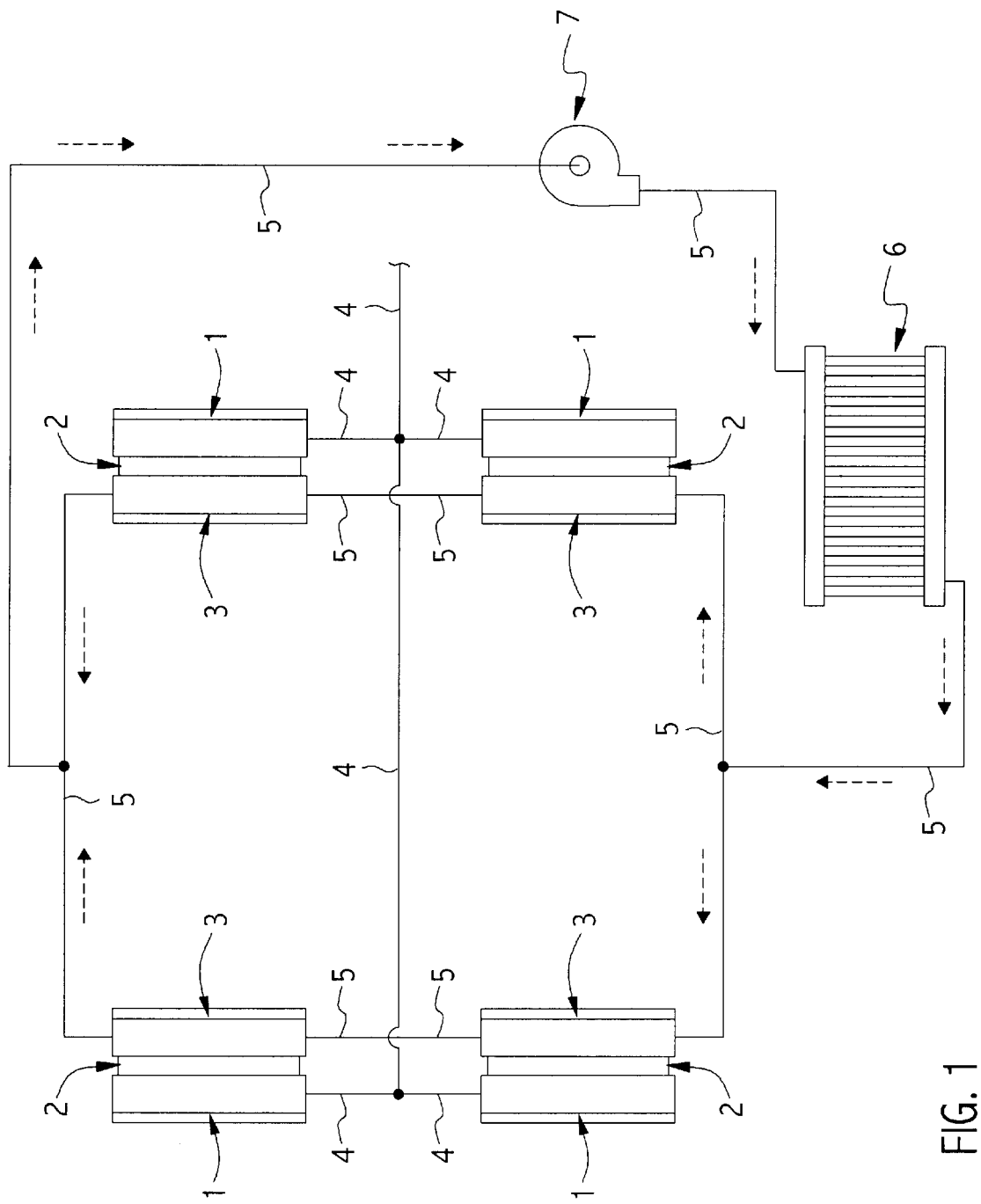
FIG. 1 is an overall schematic of the apparatus in its first embodiment of the present invention showing routing of fuel through the fuel-cooling blocks to the fuel delivery components and routing of coolant through the cooling fluid blocks and subsequently to the cooling fluid radiator.

The cooling apparatus is shown in schematic layout surrounding the intake manifold in an eight cylinder engine block in FIG. 1, in which four of the fuel cooling blocks 1 are shown as mounted adjacent to the cold side of thermoelectric units 2 and the cooling fluid blocks 3 are mounted adjacent to the hot side of the thermoelectric units. The fuel line 4 connects the fuel cooling blocks 1 to the fuel pump and fuel tank which are not pictured. The cooling fluid line 5 connects the cooling fluid blocks 3 to the cooling fluid radiator 6, which is an additional radiator distinct from that used in the engine cooling system, which is not pictured. A cooling fluid pump 7 assures controlled flow of the cooling fluid.

Figure 2:
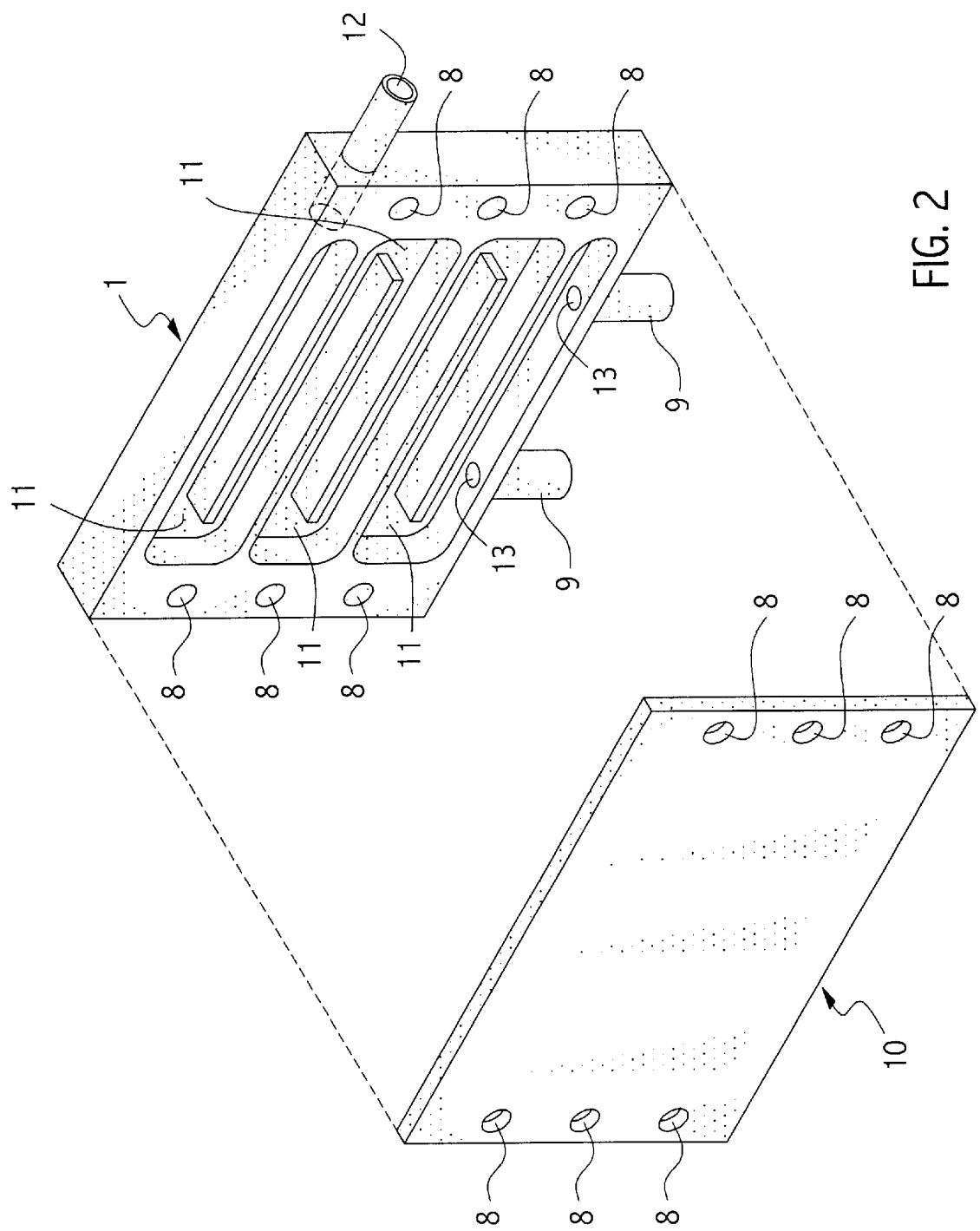
FIG. 2 is a perspective, exploded view of the fuel-cooling block in multi-piece configuration in the first embodiment, as shown in FIG. 1.

FIG. 2 is an exploded view of the fuel-cooling block 1 in a multi-piece configuration and the fuel-cooling block sealing plate 10 showing holes 8 for mounting of screws 19 (see FIG. 4) to secure the fuel-cooling block 1 to the thermoelectric unit 2. Fuel enters the fuel cooling block 1 through the fuel entry port 12 and travels through the fuel cooling opening 11 and exits the fuel exit ports 13 to the fuel injector receptor cups 9.

Figure 3:
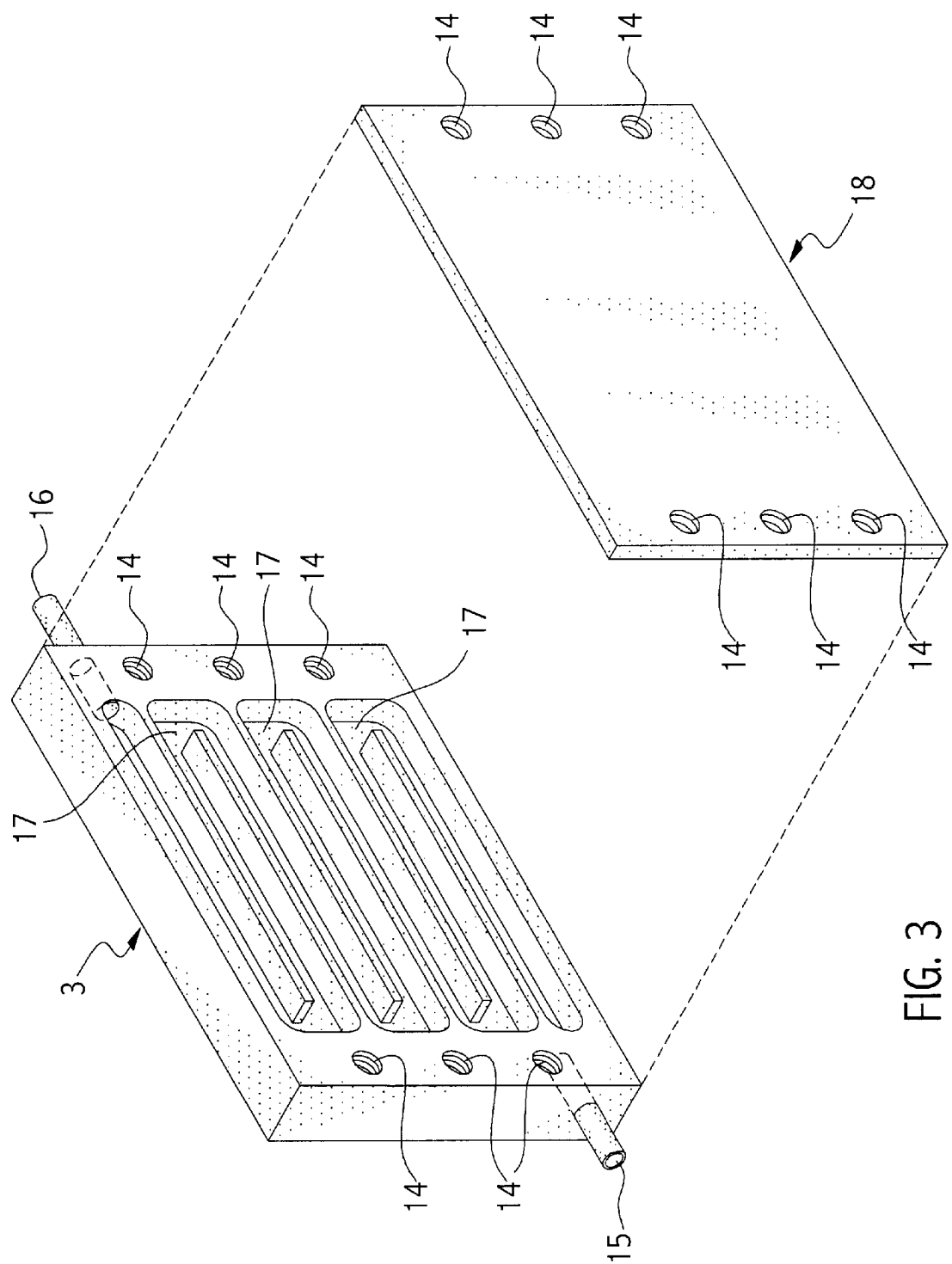
FIG. 3 is a perspective, exploded view of the cooling fluid block in multi-piece configuration in the first embodiment, as shown in FIG. 1.

FIG. 3 is an exploded view of the cooling fluid block 3 in a multi-piece configuration showing the fuel cooling block sealing plate 18 and holes 14 for mounting of screws 19 (see FIG. 4) to secure the cooling fluid block to the thermoelectric unit 2. Cooling fluid enters the cooling fluid block 3 through the cooling fluid entry port 15 and travels through the cooling fluid block opening 17 and exits through the cooling fluid exit port 16 to the cooling fluid line 5.

Figure 4:
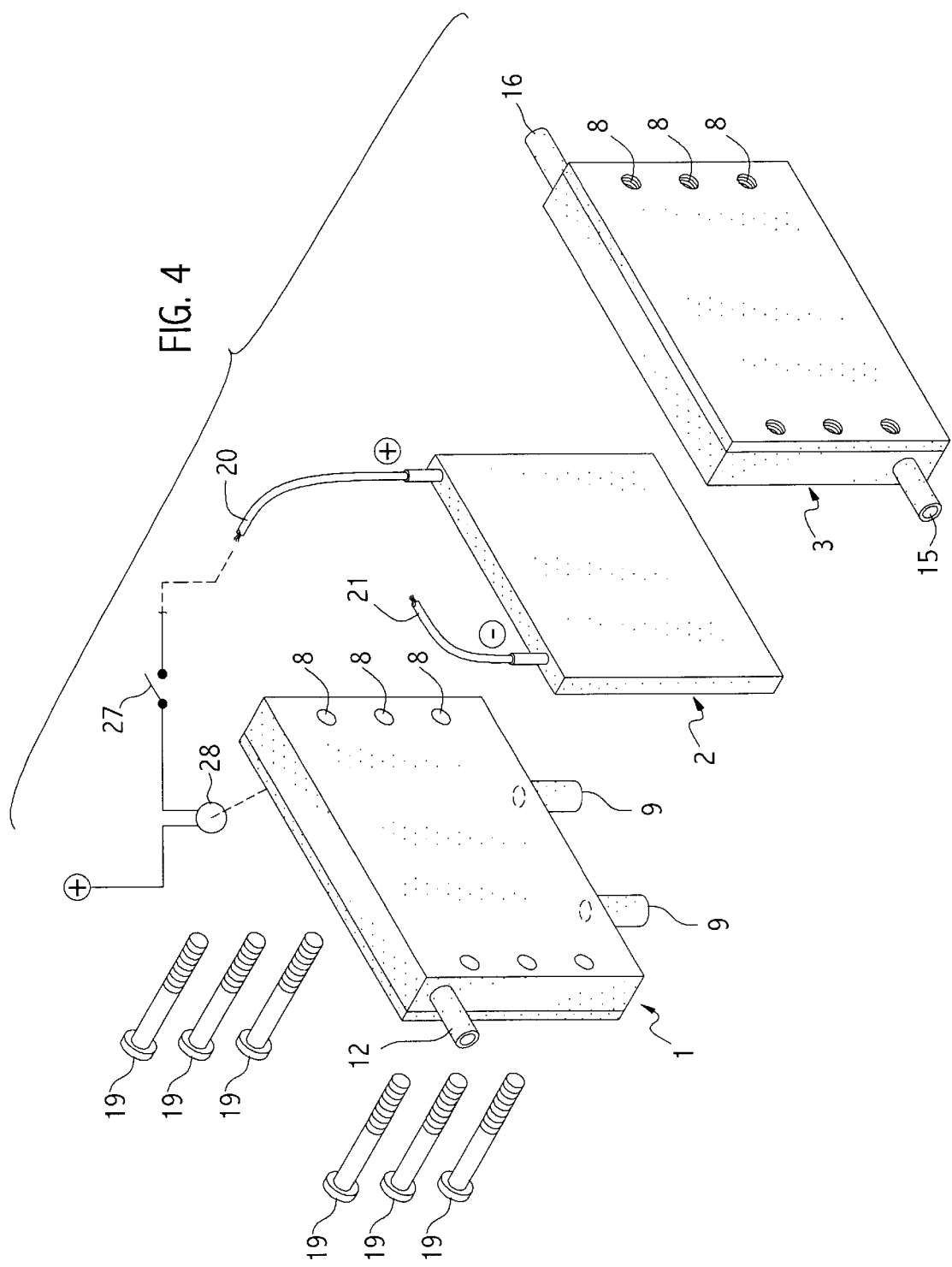
FIG. 4 is an overall view of the thermoelectric units of FIG. 1 surrounded by assembled (unexploded) fuel-cooling blocks and assembled (unexploded) cooling fluid blocks in the first embodiment.

FIG. 4 is an exploded view of the fuel-cooling block 1, thermoelectric unit 2 and cooling fluid block 3 mounted together by screws 19. The DC power source is represented by the positive terminal 20 and the negative terminal 21. An optional controllable switch 27 to interrupt the power supply to the thermoelectric unit is provided, after receiving a signal from a thermistor 28 that a pre-determined temperature has been reached.

FIG. 5 shows side views of the combined fuel cooling block 1, thermoelectric unit 2, and cooling fluid block 3, showing at least one fuel injector receptor cup 9, and cooling fluid entry port 15, mounting screws 19, and fuel entry port 12.

Figure 6:
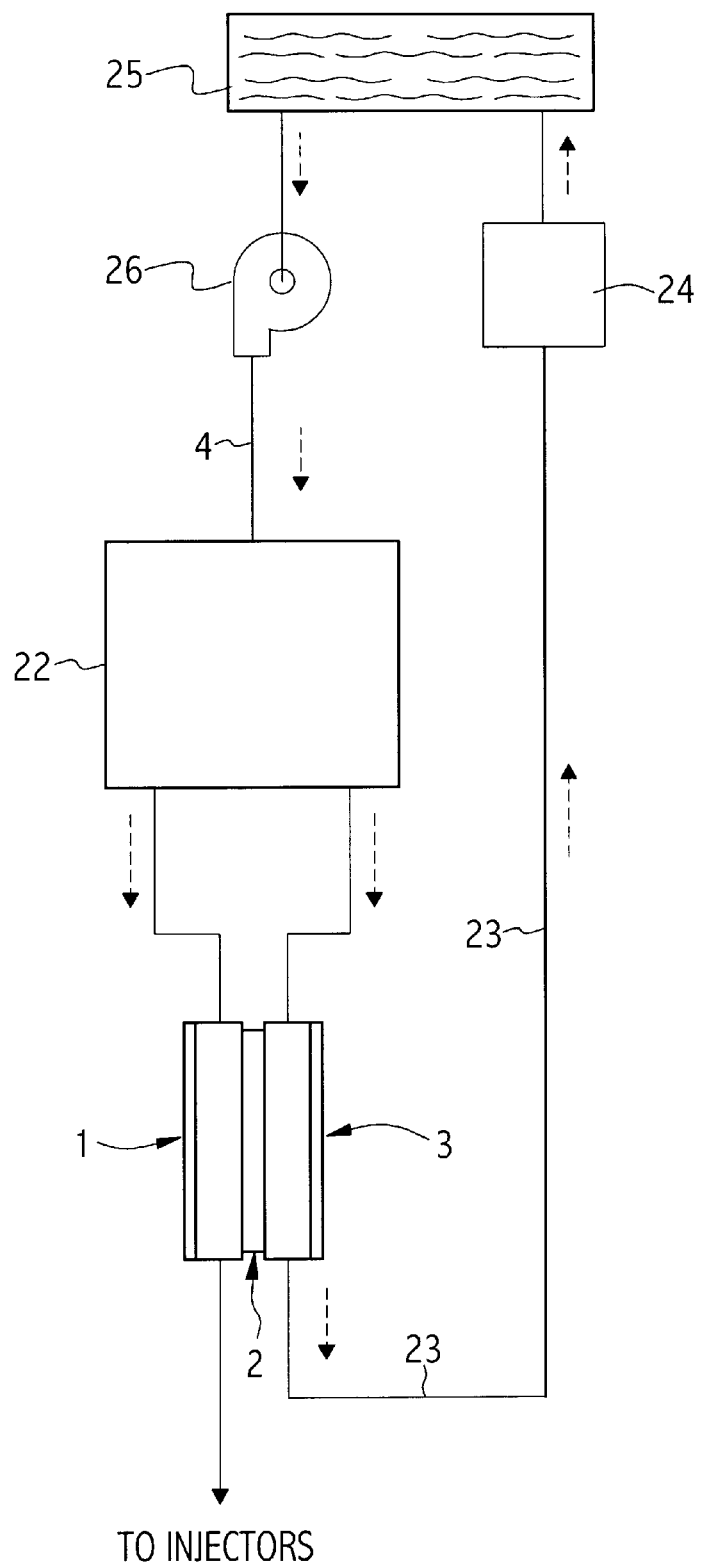
FIG. 6 is a schematic view of the apparatus in the second embodiment in which the fuel delivery components are located close together and the fuel bypass pressure regulator sends fuel to the fuel tank via a fuel bypass line which includes the cooling fluid block.

FIG. 6 shows the fuel bypass pressure regulator 22 which allows fuel to flow through the fuel line 4 to the fuel-cooling block 1 to the fuel delivery components (not shown), but also sends excess fuel through the fuel bypass line 23 to the cooling fluid block 3 and then to the fuel tank. An optional additional heat sink 24 for the fuel bypass line is coupled to the fuel tank 25 and to the fuel pump 26.

FIG. 7 is a schematic layout of a third embodiment surrounding the intake manifold in an eight cylinder engine block, in which the fuel-cooling blocks 1 are shown as mounted adjacent to the cold side of the thermoelectric units 2 and the cooling fluid blocks 3 are mounted adjacent to the hot side of the thermoelectric units. The fuel line 4 connects the fuel-cooling blocks to the fuel bypass pressure regulator 22 and the fuel tank 25 and the fuel pump 26. Excess fuel not needed for the fuel delivery components such as the fuel injectors are sent by the fuel bypass pressure regulator 22 to the bypass fuel line 23 and fuel tank 25 via the cooling fluid blocks 3.

The fuel is cooled in the fuel-cooling block by contact with the cold side of the thermoelectric unit, and the fuel's excess cooling capacity then cools the fuel delivery components. The fuel delivery components thus provide a buffer of cooling so that the fuel is cool until it is introduced into the intake manifold. The hot side of the thermoelectric unit is cooled by the cooling fluid in the cooling fluid block. In the first embodiment, the cooling fluid is contained in a separate and distinct system with its own cooling fluid radiator and pump. In the second embodiment, however, fuel bypass regulator sends excess fuel to the fuel bypass line and then to the cooling fluid block, before the excess fuel is returned to the fuel tank.

The thermoelectric unit is commercially available, for example, in 40 or 58 square millimeter sizes from TE Distributors, 1590 Keane Drive, Traverse City, Minn., 49686. The thermoelectric unit is powered by a DC connection from a power source.

The thermoelectric units cool the fuel at the most favorable location which is just prior to entry of fuel into the fuel delivery components. The ability of the thermoelectric units to provide for a super-abundance of cooling is guaranteed by addition of a second fluid cooling line which cools the hot side of the thermoelectric units, thus assuring the cold side of the thermoelectric units remain at a temperature cool enough to provide cooling of fuel at any ambient temperature and in any driving conditions. The number and size of the thermoelectric units is dependent upon the configuration and number of the engine cylinders, the size of the cooling fluid radiator, the existence and configuration of the optional heat sink and vehicle power requirements.

The fuel inside the fuel-cooling block is cooled rapidly by means of heat exchange from the fuel to the cold side of the thermoelectric unit, and then the fuel exits the fuel-cooling block and immediately enters the fuel delivery components. A cooling fluid block, made of a highly heat-conductive material such as copper, cools the hot side of the thermoelectric unit by means of heat exchange with cooling fluid circulating through an opening in the cooling fluid block. Cooling the hot side of the thermoelectric unit (which has a constant delta in temperature with the cold side) insures that the cold side of the thermoelectric remains cold enough to provide effective cooling. The fuel-cooling and the cooling fluid blocks can be either a single block containing an opening such as for example, without limitation, enclosed conduits or a multi-piece assembly including a block with channels exposed to one side and a sealing plate. In the multi-piece assembly, the plate is soldered or welded to the fuel-cooling or cooling fluid block to prevent leaks.

The thermoelectric unit is mounted between the fuel-cooling block and a cooling fluid block so that the cold side of the thermoelectric unit is coupled with the fuel-cooling block, and the hot side is coupled with the cooling fluid block. These three components are held together by screws or other fasteners which penetrate the fuel-cooling block and cooling fluid block, but not the thermoelectric unit. When screws are used, they may be partially threaded and the holes in either of the fuel-cooling block or the cooling fluid block are also threaded. Partial threading allows for slight movement of the thermoelectric unit relative to the fuel-cooling block and the cooling fluid block from expansion and contraction from changes in heat.

In one embodiment, the cooling fluid block is coupled to a cooling fluid radiator remotely located near the front of the vehicle. A pump for the cooling fluid ensures that a controlled flow of cooling fluid is available for the cooling fluid block. In another embodiment, the fuel serves as the cooling fluid. A fuel bypass pressure regulator sends excess fuel to a fuel bypass line which is coupled to the cooling fluid block. In this embodiment, the fuel returns to the fuel tank which acts as an air-cooled heat sink. Alternately, an additional heat sink may be added near the fuel tank to aid in heat exchange. This additional heat sink could be, without limitation, an additional radiator or an air-cooled heat sink.

A controllable switch is optionally provided to shut off the thermoelectric unit if the fuel temperature is lowered to a pre-determined temperature. A heat sensor such as a thermistor (a semi-conductor device with a resistance sensitive to temperature) is mounted on the fuel-cooling block and sends a signal either to an onboard diagnostic computer (which sends a signal to a switch to open the power circuit to the thermoelectric unit). A desired functionality is one of an interface between the thermistor and the switch, which actually turns the thermoelectric units on and off. Alternatively, the thermistor may be coupled directly to a switch, which then opens the power circuit to the thermoelectric unit. The heat sensor could also be mounted on the cooling fluid block. Examples of a suitable thermistor are the NTC or PTC models available from Thermometrics, Inc., in 808 U.S. Highway 1, Edison, N.J., 08817-4695, USA.

I claim:

1. An apparatus for cooling fuel and fuel delivery components in an internal combustion engine, comprising:
   at least one fuel-cooling block, having at least one fuel entry port for receiving fuel from a fuel tank and having at least one fuel exit port coupled to said fuel delivery components for supplying cooled fuel thereto;
   a system for circulating cooling fluid, comprising: at least one cooling fluid block having at least one cooling fluid entry port coupled to a cooling fluid pump, and having at least one cooling fluid exit port coupled to a cooling fluid radiator in which heat is exchanged, said cooling fluid block, said cooling fluid pump and said cooling fluid radiator being coupled to allow cooling fluid to circulate through said system; and
   A thermoelectric unit, having electrical terminals for receiving power from a power supply, having a cold side thermally coupled with said fuel-cooling block for heat exchange, and having a hot side thermally coupled with said cooling fluid block for heat exchange;
   such that the fuel is cooled by exchanging heat from said fuel to said cold side of said thermoelectric unit, and such that said cooled fuel also cools the fuel delivery components.

2. The apparatus as in claim 1, further comprising a controllable switch to interrupt the power supply to said thermoelectric unit in the event fuel is cooled to a pre-determined temperature.

3. The apparatus as in claim 1, in which at least one fuel injector receptor cup couples said fuel exit port to said fuel delivery components.

4. An apparatus for cooling fuel in an internal combustion engine, comprising:
   at least one fuel-cooling block, having at least one fuel entry port for receiving fuel from a fuel tank and having at least one fuel exit port coupled to said fuel delivery components for supplying cooled fuel thereto;
   a system for circulating cooling fluid, comprising: at least one cooling fluid block having at least one cooling fluid entry port coupled to a cooling fluid pump, and having at least one cooling fluid exit port coupled to a cooling fluid radiator in which heat is exchanged, said cooling fluid block, said cooling fluid pump and said cooling fluid radiator being coupled to allow cooling fluid to circulate through said system; and
   said thermoelectric unit, having electrical terminals for receiving power from a power supply, having a cold side thermally coupled with said fuel-cooling block for heat exchange, and having a hot side thermally coupled with said cooling fluid block for heat exchange;
   such that the fuel is cooled by exchanging heat from said fuel to said cold side of said thermoelectric unit.

5. The apparatus as in claim 4, further comprising a controllable switch to interrupt the power supply to said thermoelectric unit in the event fuel is cooled to a pre-determined temperature.

6. The apparatus as in claim 4, in which at least one fuel injector receptor cup couples said fuel exit port to said fuel delivery components.

* * * * *